United States Patent [19]

Krennbauer

[11] 4,431,454

[45] Feb. 14, 1984

[54] PROCESS AND APPARATUS FOR PRODUCING CEMENT

[75] Inventor: Franz Krennbauer, Linz, Austria

[73] Assignees: Voest-Alpine Aktiengesellschaft, Linz, Austria; VEB Schwermaschinenbau-Kombinat "Ernst Thälmann", Magdeburg, German Democratic Rep.

[21] Appl. No.: 434,890

[22] Filed: Oct. 18, 1982

[30] Foreign Application Priority Data

Nov. 3, 1981 [AT] Austria ................................ 4693/81

[51] Int. Cl.³ .............................................. C04B 7/44
[52] U.S. Cl. ..................................... 106/100; 432/14; 432/106
[58] Field of Search ................... 106/100; 432/14, 106

[56] References Cited

U.S. PATENT DOCUMENTS

4,318,745  3/1982  Kraus .................................. 106/100

FOREIGN PATENT DOCUMENTS

| 2534498 | 2/1976 | Fed. Rep. of Germany | 106/100 |
| 2618489 | 5/1978 | Fed. Rep. of Germany | 106/100 |
| 2716454 | 8/1979 | Fed. Rep. of Germany | 106/100 |
| 2931590 | 2/1980 | Fed. Rep. of Germany | 106/100 |
| 3037929 | 5/1981 | Fed. Rep. of Germany | 106/100 |
| 2344056 | 7/1981 | Fed. Rep. of Germany | 106/100 |

Primary Examiner—James Poer
Attorney, Agent, or Firm—Kurt Kelman

[57] ABSTRACT

In a process of producing cement, the ground raw material is de-acidified in a calcinator and is subsequently burnt in a kiln and before being de-acidified in the calcinator is subjected to a multi-stage heat exchange with exhaust gas streams from the kiln and from the calcinator in two parallel series of heat exchange stages. The stream of ground raw material is delivered from heat exchange stages of each of said series to respective heat exchange stages of the other of said series. In order to improve the thermal efficiency and to reduce the equipment expenditure, the exhaust gas stream from the kiln is caused to deliver heat to the ground raw material in an additional heat exchange stage, which directly precedes the calcinator in the flow path of the ground raw material, and the exhaust gas stream from the kiln is subsequently mixed with the exhaust gas stream from the calcinator. The resulting stream of mixed exhaust gases is uniformly distributed to the two series of heat exchange stages.

5 Claims, 1 Drawing Figure

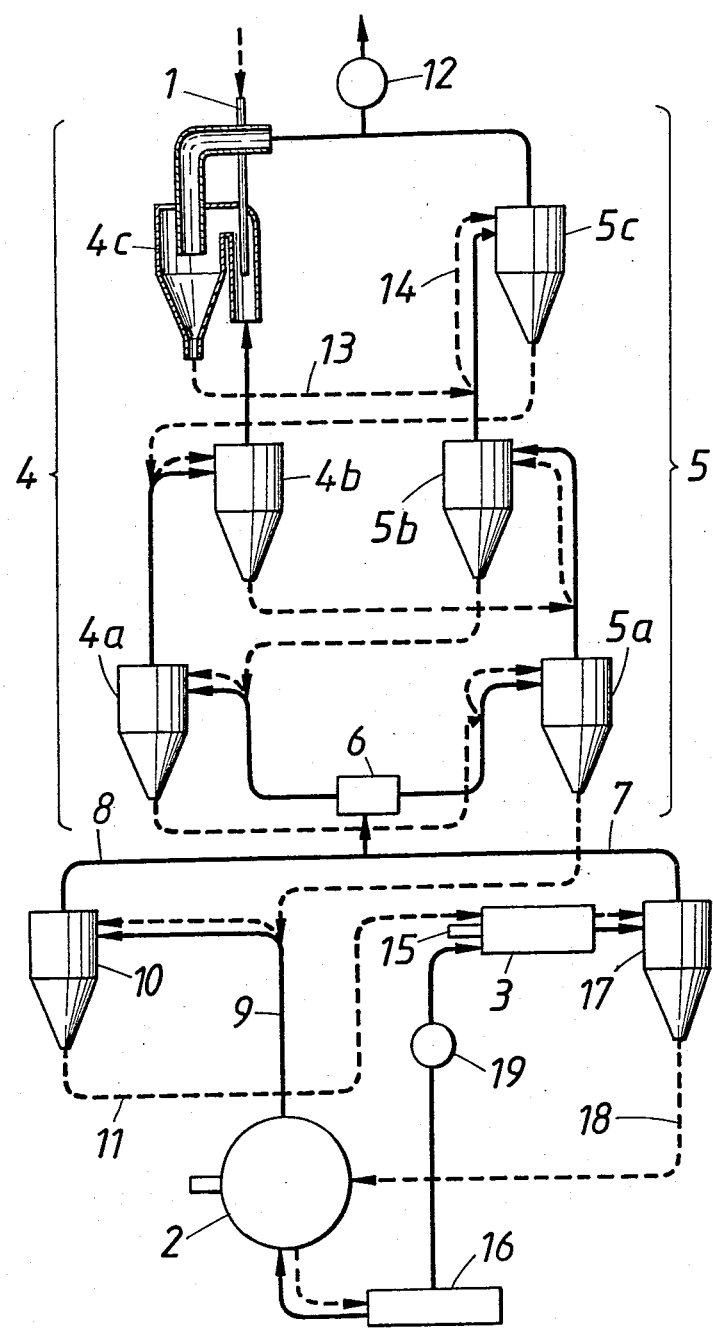

PROCESS AND APPARATUS FOR PRODUCING CEMENT

This invention relates to a process of producing cement wherein the ground raw material is de-acidified in a calcinator and is subsequently burnt in a kiln and before being de-acidified in the calcinator is preheated by a multistage heat exchange with exhaust gas streams from the kiln and from the calcinator in two parallel series of heat-exchange stages, which are flown through by exhaust gases from the kiln and from the calcinator, wherein the ground raw material is delivered from heat exchange stages of each of said series to respective heat exchange stages of the other series, and to apparatus for carrying out the process.

In order to improve the de-acidification in the calcinator by a reduction of the carbon dioxide partial pressure and to improve the preheating the ground raw material mixture before it enters the calcinator, it is known from Laid-open German Application No. 29 31 590 to supply the calcinator with the cooling air which has been heated by the cooling of the burnt cement clinker rather than with the exhaust gas from the kiln, to conduct the exhaust gas streams from the kiln and from the calcinator, respectively, in two separate, parallel series of heat exchange stages of a multistage heat exchanger, and to conduct the stream of ground raw material in alternation from a heat exchange stage of one series to a heat exchange stage of the other series until the calcinator is reached. Owing to these measures, the calcinator is not supplied with the exhaust gases from the kiln, which would be detrimental. Besides, in the heat exchange stage immediately preceding the calcinator in the direction of flow of ground raw material the hot exhaust gas from the kiln can be used to preheat the ground raw material to a higher temperature than would be possible if the exhaust gas were conducted in a single line. But that known process has the disadvantage that the ground raw material must be charged in two partial streams in controlled proportions in order to ensure that the two exhaust gas streams at the cold end of the heat exchanger will be at approximately the same temperature. Whereas these two partial streams are subsequently recombined and are jointly conducted between the heat exchange stages of the two series, this conducting of the ground raw material involves a higher expenditure and also a poorer utilization of heat because under conditions which are equal in other respects the outlet temperatures of the exhaust gas streams depend on the mass ratio of ground raw material and exhaust gas. Besides, a separate blower is required for each exhaust gas stream unless an oversize blower is used in view of the different temperatures and pressures of the exhaust gases. Finally, the two series of heat exchange stages of the heat exchanger must be designed with different dimensions because the exhaust gas streams have different flow rates and the concentration of ballast is much higher in the series flown through by the exhaust gases from the kiln than in the series flown through by the exhaust gases from the calcinator so that special measures in the series flown through by the exhaust gases from the kiln may be required.

It is an object of the invention to avoid these disadvantages and so to improve a process of the kind described first hereinbefore for the production of cement that the equipment expenditure is greatly reduced and the thermal efficiency can be improved.

This object is accomplished in accordance with the invention in that the exhaust gas stream from the kiln is caused to deliver heat to the ground raw material in an additional heat exchange stage, which directly precedes the calcinator in the flow path of the ground raw material, the exhaust gas from the kiln is subsequently mixed with the exhaust gas stream from the calcinator and the resulting stream of mixed exhaust gases is uniformly distributed to the two series of heat exchange stages of the heat exchanger.

The mixing of the exhaust gas streams from the kiln and from the calcinator ensures that equal conditions in the two series of heat exchangers will be obtained in a simple manner so that the ground raw material need not be charged in two partial streams. As a result, the sensible waste heat of the exhaust gas streams is utilized in an improved manner and the equipment expenditure is reduced because the two series of heat exchange stages can have the same design. Exhaust gases at equal rates and under the same pressure flow through the several heat exchange stages of both series. Besides, the concentration of ballast is the same in both series of heat exchange stages and is lower than in a separate series flown through only by the exhaust gases from the kiln so that the tendency to cake is also decreased.

Because the same pressure conditions are obtained in both series of heat exchangers, the partial streams of mixed exhaust gases can readily be combined before they are blown into the open so that a common blower can be used.

A plant or apparatus for carrying out the process may comprise a kiln for burning the de-acidified ground material, a calcinator, which precedes the kiln, and a multistage heat exchanger, which precedes the calcinator and comprises heat exchange units arranged in two parallel series, which are connected to the exhaust gas lines of the kiln and of the calcinator, wherein the ground raw material outlets of heat exchange units of each of said series are connected to the ground material inlets of respective heat exchange units of the other of said series. If in such apparatus the exhaust gas line from the calcinator and the gas outlet of an additional heat exchange unit, which directly precedes the calcinator in the flow path of the ground raw material and is directly connected to the exhaust gas line from the kiln, are connected to a mixing chamber, which is connected to the gas inlets of the two series of heat exchange units, a stream of mixed exhaust gases from the kiln and from the calcinator will be produced in a very simple manner and that stream of mixed exhaust gases will be distributed to the two series of heat exchange units. A flow rate controller may be used to ensure the desired proportional distribution between the two series of heat exchange units if this is required. In general, the mixing chamber need not be specially designed for that purpose. The connection of the exhaust gas line from the calcinator to the duct connected to the gas outlet of the heat exchange unit which is directly connected to the exhaust gas line from the kiln will generally be sufficient for an adequate mixing of the exhaust gas streams from the kiln and from the calcinator.

Apparatus for carrying out the process according to the invention for producing cement is shown by way of example on the drawing in a simplified block diagram.

The flow paths for the ground material are indicated by dotted lines. Ground raw material is supplied by a feed line 1 to a multistage heat exchanger, which is heated by the exhaust gases from a rotary kiln 2 used to burn preheated and calcined ground material, and by the exhaust gases from a calcinator 3, which precedes the rotary kiln. In accordance with FIG. 1, that heat exchanger comprises two parallel series 4 and 5 of heat exchange units 4a, 4b, 4c, 4d and of heat exchange units 5a, 5b, 5c. These heat exchange units consist of cyclones. As is apparent from the flow paths for the exhaust gas streams, which are indicated by solid lines, the series 4 and 5 of heat exchange units are connected to a mixing chamber 6, the inlet of which communicates with the exhaust gas conduit 7 from the calcinator 3 and with the gas outlet 8 of an additional heat exchange unit 10, which is connected to the kiln exhaust gas line 9 and has a ground raw material outlet 11 connected to the calcinator 3. Two partial streams of mixed exhaust gases are delivered from the mixing chamber 6 to the heat exchange units 4a and 5a, respectively, and flow through the series 4 and 5, respectively. Thereafter the two partial streams are recombined and discharged into the open by a common blower 12.

The ground raw material is supplied in the feed line 1 to the heat exchange unit 4c of the heat exchanger and from said unit flows through the discharge duct 13 to the inlet 14 of the heat exchange unit 5c of the series 5 of heat exchange units. The stream of ground raw material is subsequently supplied to heat exchange units of the series 4 and 5 in alternation so that the ground raw material is preheated in stages. Before the ground raw material is supplied to the calcinator 3, it is passed through an additional heat exchange unit 10, which is heated only by the exhaust gas from the kiln so that the ground raw material can be preheated to a higher temperature because the exhaust gases from the kiln are hotter than those from the calcinator 3. The exhaust gases from the kiln are cooled in the heat exchange unit 10 so that the temperature in the mixing chamber 6 and the exhaust gas temperature in the blower 12 are reduced.

The ground raw material is de-acidified in the calcinator 3. The additional heat requried for this purpose is supplied by a burner 15. The combustion air consists preferably of part of the heated cooling air from a cooler 16, which succeeds the rotary kiln 2 and receives the cement clinker formed by the burning of the ground material in the rotary kiln. Another part of the cooling air from the cooler 16 is supplied as combustion air to the rotary kiln 2. The ground material which has been de-acidified in the calcinator 3 and the stream of exhaust gas from the calcinator are fed to a cyclone separator 17, from which ground materials is supplied through a discharge duct 18 to the rotary kiln 2. The supply of combustion air to the calcinator 3 at the required rate, which depends on the fuel-burning rate, is controlled by a hinged valve 19.

Because the series 4 and 5 of heat exchange units have the same design, they are usually flown through by exhaust gases at the same flow rates. But a control of the distribution of the stream of mixed exhaust gases may be enforced by suitable control means.

The block diagram of apparatus according to the invention for the production of cement shows clearly that the mixing of the exhaust gas streams from the kiln 2 and from the calcinator 3 ensures that equal conditions are obtained in the two series 4 and 5 of the heat exchanger. These conditions permit a simplification of the equipment used in the plant and a process which has a high thermal efficiency and which strongly reduces the disadvantages resulting from the high ballast concentrations which otherwise occur in the series of heat exchange units connected to the kiln.

What is claimed is:

1. In a process of producing cement, comprising
    de-acidifying ground raw material in a calcinator to obtain de-acidified ground material and calcinator exhaust gas;
    burning said de-acidified ground material in a kiln to obtain cement clinker and kiln exhaust gas; and
    subjecting ground raw material to be de-acidified in said calcinator to a heat exchange with said calcinator exhaust gas and said kiln exhaust gas in a plurality of heat exchange stages arranged in two series, which are flown through in parallel by said calcinator exhaust gas and said kiln exhaust gas, said ground raw material being delivered from said heat exchange stages of each of said stages to respective heat exchange stages of the other of said series, whereby said ground raw material is preheated,
    the improvement residing in that
    said ground raw material which has passed through said heat exchange stages of said two series is subjected in an additional heat exchange stage to a further heat exchange with said kiln exhaust gas before the latter is supplied to said heat exchange stages of said two series, whereby said ground raw material is further preheated;
    said ground raw material is supplied from said additional heat exchange stage to said calcinator;
    said kiln exhaust gas from said additional heat exchange stage is mixed with said calcinator exhaust gas before the latter is supplied to said heat exchange stages of said two series, whereby mixed exhaust gases are formed; and said mixed exhaust gases are supplied in two equal partial streams to said two series of heat exchange stages, respectively.

2. The improvement set forth in claim 1, wherein said two partial streams which have flown through said two series of heat exchange stages are combined to form a common exhaust gas stream, which is blown into the open.

3. In apparatus for producing cement, comprising
    a calcinator for de-acidifying ground raw material to obtain de-acidified ground material and calcinator exhaust gas;
    a kiln for burning said de-acidified ground material to obtain cement clinker and kiln exhaust gas; and
    a heat exchanger for preheating said ground raw material to be de-acidified in said calcinator; said heat exchanger comprising a plurality of heat exchange units, which are arranged in two series connected to be flown through in parallel by said calcinator exhaust gas and said kiln exhaust gas in a heat exchange relation with said ground raw material to preheat the latter, and duct means for delivering ground raw material from heat exchange units of each said series to respective heat exchange units of the other of said series,
    the improvement residing in that
    an additional heat exchange unit is provided, which is connected between said kiln and said two series of heat exchange units in the flow path of said kiln exhaust gas, and between said two series of heat exchange units and said calcinator in the flow path of said ground raw material, mixing means are connected between said additional heat exchange unit and said two series of heat said additional heat exchange unit and said two series of heat exchange units in the flow path of said kiln exhaust gas and between said calcinator and said two series of heat exchange units in the flow path of said calcinator exhaust gas and are adapted to mix said kiln exhaust gas and said calcinator exhaust gas so as to form mixed exhaust gases, and first and second ducts are provided for delivering said mixed exhaust gases in two equal partial streams from said mixing means to said two series of heat exchange units, respectively.

4. The improvement set forth in claim 3, wherein said mixing means comprise a mixing chamber, which is connected by said first and second ducts to said two series of heat exchange units, respectively, and is connected to receive kiln exhaust gases from said additional heat exchange stage and calcinator exhaust gases from said calcinator.

5. The improvement set forth in claim 3, wherein a common blower is provided for sucking said partial streams from both said series of heat exchange units and for delivering a common exhaust gas stream.

* * * * *